Jan. 8, 1929.
F. E. HUMMEL ET AL
1,697,914
FAMILY BREAD TOASTER
Original Filed Jan. 12, 1924    2 Sheets-Sheet 1
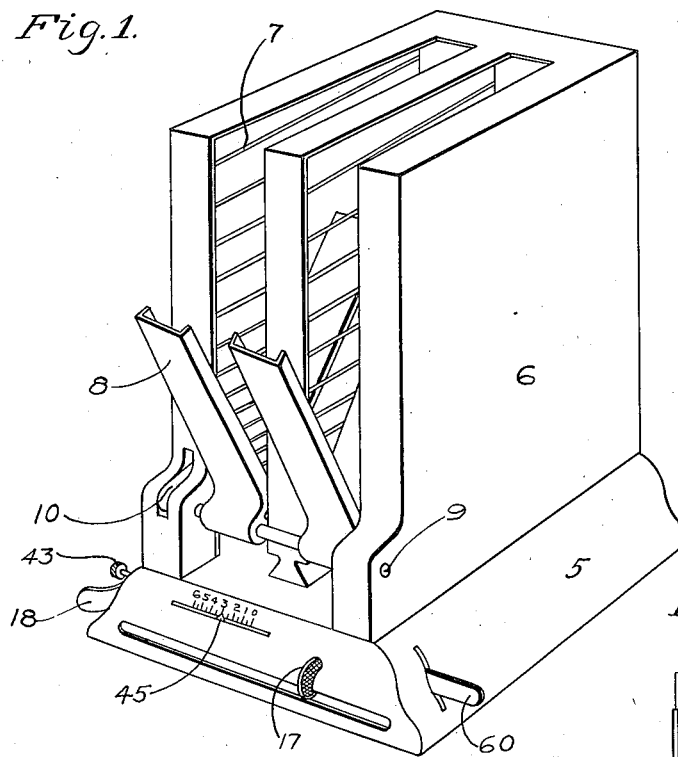
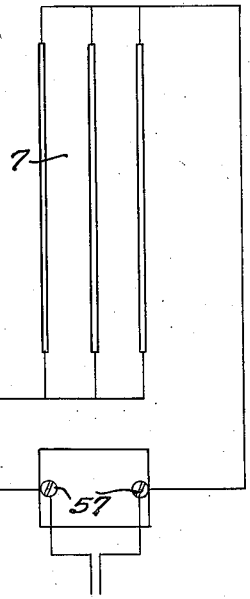
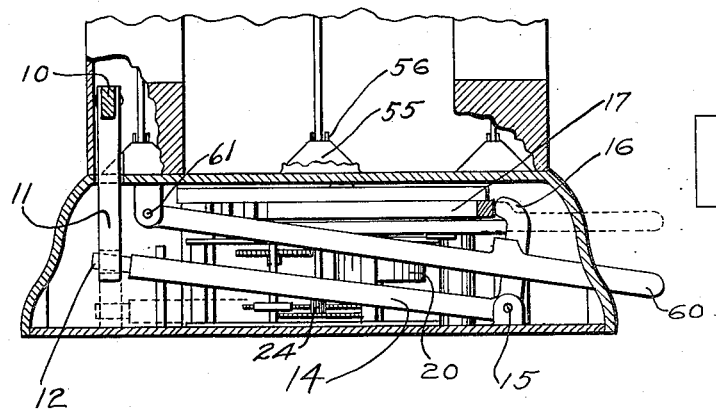
Inventors:
F. E. Hummel.
J. J. Noeth.
Milo B. Stevens
Attorneys

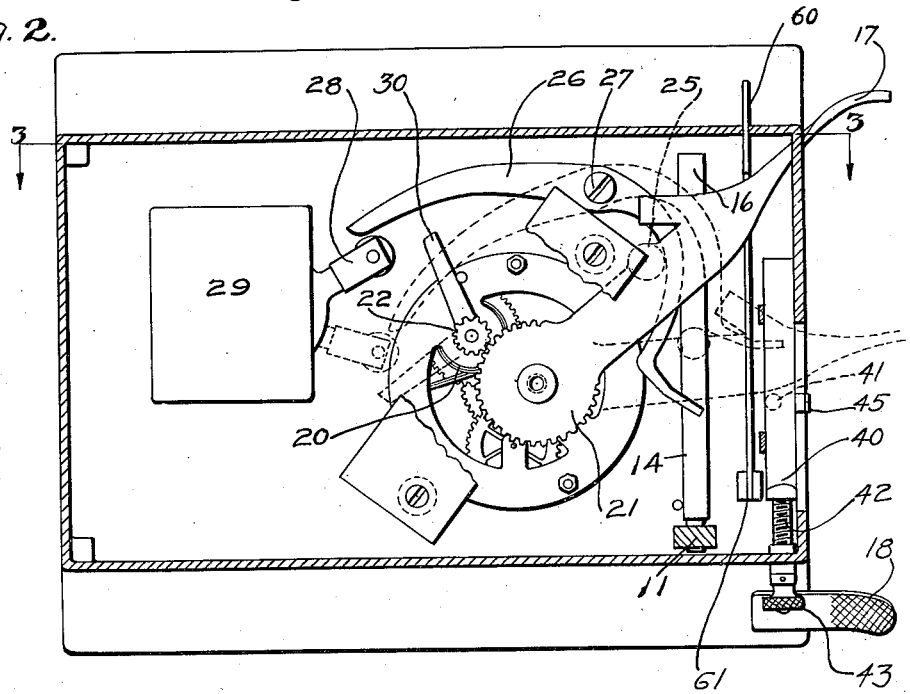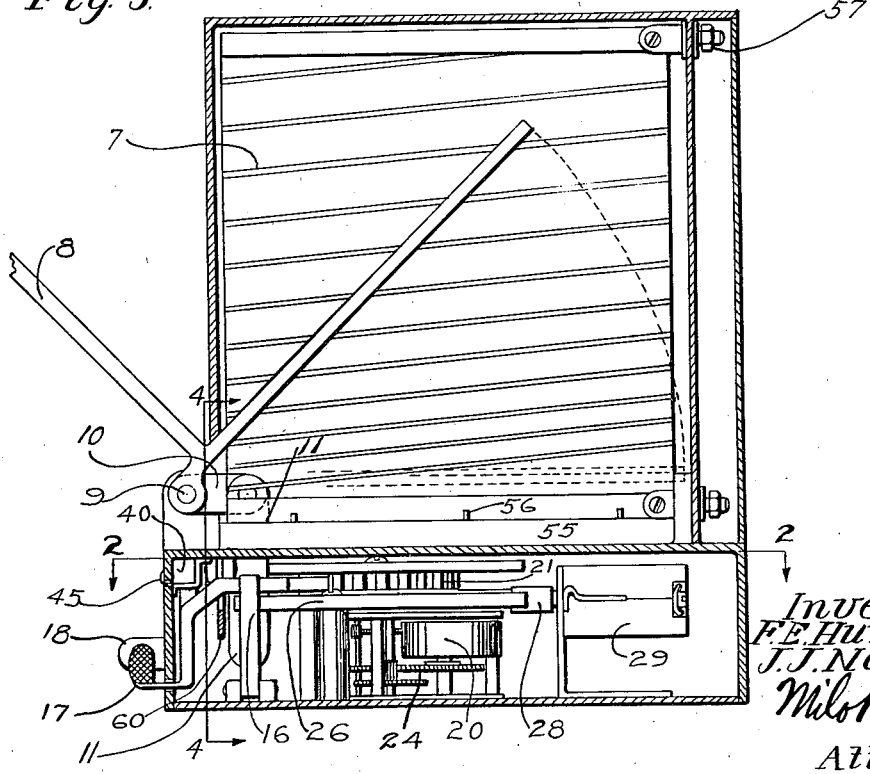

Patented Jan. 8, 1929.

1,697,914

UNITED STATES PATENT OFFICE.

FREDERICK E. HUMMEL AND JOHN J. NOETH, OF CHICAGO, ILLINOIS.

FAMILY BREAD TOASTER.

Application filed January 12, 1924, Serial No. 685,850. Renewed June 1, 1928.

This invention relates to bread toasters and more particularly to that type of toaster which employ electric heating elements.

Briefly stated an important object of this invention is to provide an electric toaster wherein the manipulation of a single operating member closes the circuit through the heating elements and places the bread in toasting position for a predetermined period.

A further object is to provide a bread toaster wherein the bread is automatically moved to discharge position at the end of a predetermined interval, the toasting period being entirely under the control of the operator.

A further object is to provide an electric toaster which is of highly simplified construction, sanitary and comparatively cheap to manufacture.

Other objects and advantages will be apparent during the course of the following description.

In the accompanying drawings forming a part of this application and in which like numerals are employed to designate like parts throughout the same, Figure 1 is a perspective of the improved toaster, Figure 2 is a horizontal sectional view through the same, Figure 3 is a vertical sectional view through the toaster, Figure 4 is a detail sectional view through the toaster illustrating the operating mechanism, Figure 5 is a view of the wiring diagram.

In the drawing wherein for the purpose of illustration is shown a preferred embodiment of the invention, the numeral 5 designates a hollow base upon which a superstructure or bread carrier 6 is secured in any suitable manner. Figure 1 illustrates that the superstructure 6 consists of a plurality of spaced parallel partitions within which heating elements 7 are located. The partitions define a plurality of stalls for the reception of slices of bread to be toasted by the heating elements. The sides of the superstructure may be closed as illustrated or open without departing from the spirit of the invention. Also, one of the ends is open for the passage of the bread and the top of the superstructure is open to prevent the formation of a dead air space.

The several slices of bread are mounted on approximately L-shaped bread carriers 8 keyed or otherwise secured to a transversely extending shaft 9 so that when the shaft is rocked the bread carriers will be moved to the position illustrated in Figure 1 or to the bread toasting position between the heating elements.

At the end of a pre-determined interval the shaft 9 is rocked to swing the bread carriers to their unloading position and in this connection it will be observed that one end of the shaft is provided with a crank 10 to which a vertically movable link 11 is connected. The lower end of the link is slotted as illustrated in Figure 4 to freely receive the reduced end 12 of a lever 14. The lever 14 is fulcrumed as indicated at 15. Figure 4 also illustrates that the lever is provided with an upwardly directed branch 16 arranged in the path of travel of and adapted to be engaged by a spring actuated lever or winding member 17.

The lever 17 engages the short branch 16 of the lever 14 only at the end of a pre-determined interval and in the meantime the weight of the long branch of the lever 14 combined with the weight of the carrier and the bread urges the carrier to bread-toasting position.

Figures 1 and 2 illustrate that the arm 17 has a finger contact portion arranged exteriorly of the base so that it may be drawn in the direction of a fixed thumb piece 18 by merely drawing the fingers in the direction of the thumb. The arm 17 may be moved in the direction of the thumb rest 18 for winding a spring designated by the numeral 20 and which spring is the main actuating element of the invention. It might be said that the spring is a part of a spring motor which is wound by the arm 17, the inner end of which is provided with a gear 21 meshing with a substantially smaller gear 22. The gear 22 is in turn connected by suitable means to the spring in such a manner that the manual swinging of the arm 17 to the dotted line position illustrated in Figure 2 results in the winding of the spring. An escapement mechanism 24 is employed to extend the unwinding of the spring over a definite period.

When the arm 17 is moved to the dotted line position illustrated in Figure 2 a lug 25 (Figure 2) carried by the same engages the curved outer portion of a switch operating finger 26, the said switch operating finger being pivoted as indicated at 27 and having its inner end adapted to contact with a switch arm 28 to move the switch arm to the dotted line position illustrated. When the switch arm 28 is moved to the dotted line position, the switch 29 is closed for completing the circuit through the heating elements.

As the spring gradually unwinds a radial switch operating member 30 rigidly secured to the gear 22 swings the switch arm 28 to the full line position illustrated in Figure 2 and therefore breaks the circuit through the heating elements. However, the switch arm is not swung to the full line position until the end of a pre-determined interval. It is believed to be clear that the ratio of gear 21 to gear 22 will effect the movement of arm 30 past switch arm 28 before the latter is swung to circuit closing position by the action of finger 26 in the winding stroke of motor arm 17. Thus, the said driven arm 30 of the small gear 22 will be positioned in advance of switch arm 28 to actuate the same to break the circuit at approximately the time the motor arm 17 reaches the end of its driven stroke.

From the foregoing it will be seen that when it is desired to operate the toaster, several slices of bread may be placed on edge in the several carriers and the arm 17 moved to the dotted line position illustrated in Figure 2. As previously stated, when the arm 17 is moved to the dotted line position it releases the lever 14 so that the bread to be toasted is moved by gravity to a position between the heating elements.

The movement of the arm 17 to the dotted line position in Figure 2 energizes the spring motor with the result that the radial switch operating member is gradually returned from the dotted line position to the full line position for cutting off the switch at the end of the toasting period.

The toasting period may be regulated by a stop member 40 having a depending lug 41 arranged in the path of travel of and engaged by the arm 17 so that the winding of the spring 20 is limited. The stop member 40 and the lug 41 may be adjusted by means of a screw 42, the outer end of which is provided with a knurled member 43. The stop member 40 is provided with a pointer 45 movable through a slot in the front of the base and playing over a scale which indicates the number of minutes the bread is to be toasted.

In carrying out the invention the several heating elements may be mounted upon supporting strips 55, the upper sides of which are beveled or inclined for shedding the crumbs. Figure 4 illustrates that the tops of the supporting members 55 are provided with retaining pins 56 for the several heating elements and the rear portions of the heating elements may have connection with binding posts 57 connected with the switch and a suitable source of electric energy.

Also, the clock or spring motor mechanism may be provided with a safety latch 60 pivoted as indicated at 61 and adapted to be swung into engagement with the arm 17 to prevent free swinging movement of the same and damage to the mechanism when not in use or when the toaster is being handled in trade.

Having thus described the invention, what is claimed is:—

1. In a toaster having a movable bread carrier, a heating unit and a heat supply cut-off therefor, a time control mechanism comprising a carrier operating means normally tending to maintain the carrier in toasting position, a spring motor, a driven element carried thereby and normally engaging said carrier operating means to maintain the carrier out of toasting position, said driven element being manually movable in the opposite direction to energize said motor, a cut-off opening means operable by said driven element in its motor energizing stroke, and a cut-off closing means operable by said driven element in its driven stroke.

2. In a toaster having a movable bread carrier, a heating unit and a heat supply cut-off therefor, a time control mechanism comprising a carrier operating means normally tending to maintain the carrier in toasting position, yielding means normally acting upon said carrier operating means to maintain said carrier out of toasting position, said yielding means being manually movable away from said carrier operating means, and cut-off controlling means associated with said yielding means and operable in the movement of the latter away from said carrier operating means for opening said cut-off and effective to close said cut-off in the return movement of said yielding means to engage said carrier operating means.

3. In a time controlled toaster having a movable bread carrier, a carrier operating means normally tending to maintain the carrier in toasting position, yielding means normally engaging said carrier operating means to maintain the carrier out of toasting position, and said yielding means being manually movable away from said carrier operating means to permit the latter to actuate the carrier to toasting position.

4. In a toaster having a movable bread carrier, a heating unit and a heat supply cut-off therefor, a time control mechanism comprising a carrier operating means normally tending to maintain the carrier in toasting position, a spring motor, an arm carried by said motor and adapted to be driven thereby in a direction to engage said carrier operating means and through the same to move and retain said carrier out of toasting position, said arm being manually movable in the opposite direction to permit said carrier operating means to bring the carrier to toasting position, a cut-off opening lever operable by said arm in its last mentioned movement, a cut-off closing lever, and a geared connection between said arm and said cut-off closing lever for actuating the same in the driven stroke of said arm.

5. In a toaster having a movable bread carrier, a heating unit and a heat supply cut-off therefor, a time control mechanism comprising a lever operatively engaging said carrier and having a relatively long gravity actuated branch forming a means to urge said carrier to toasting position, said lever having a second branch, yielding means normally acting upon said second branch for actuating said lever against the weight of said gravity actuated branch to hold said carrier out of toasting position, said yielding means being manually movable away from said second branch, and cut-off controlling means associated with said yielding means and operable in the movement of the latter away from said second branch for opening said cut-off and effective to close said cut-off in the return movement of said yielding means to said branch.

6. In a toaster having a movable bread carrier, a time control mechanism comprising a lever operatively engaging said carrier and having a relatively long gravity actuated branch forming a means to urge said carrier to toasting position, said lever having a second branch, and yielding means normally acting upon said second branch for actuating said lever against the weight of said gravity actuated branch to hold said carrier out of toasting position, said yielding means being manually movable away from said second branch.

7. In a toaster having a movable bread carrier, a heating unit and a heat supply cut-off therefor, a time control mechanism comprising a lever operatively engaging said carrier and having a relatively long gravity actuated branch forming a means to urge said carrier to toasting position, said lever having a second branch, a spring motor, an arm carried by said motor and adapted to be driven thereby in a direction to engage said second lever branch and through the same to move and retain said carrier out of toasting position, said arm being manually movable in the opposite direction to permit the gravity actuated branch of said carrier operating lever to move the same to toasting position, a cut-off opening lever operable by said arm in its last mentioned movement, a cut-off closing lever, and a geared connection between said arm and said cut-off closing lever for actuating the same in the driven stroke of said arm.

8. In a toaster having a movable bread carrier, a time control mechanism comprising a lever operatively engaging said carrier and having a relatively long gravity actuated branch forming a means to urge said carrier to toasting position, said lever having a second branch, a spring motor, and an arm carried by said motor and adapted to be driven thereby in a direction to engage said second lever branch and through the same to move and retain said carrier out of toasting position, said arm being manually movable in the opposite direction to permit the gravity actuated branch of said carrier operating lever to move the same to toasting position.

In testimony whereof we affix our signatures.

FREDERICK E. HUMMEL.
JOHN J. NOETH.